United States Patent [19]

Margaria et al.

[11] Patent Number: 6,057,469
[45] Date of Patent: May 2, 2000

[54] PROCESS FOR MANUFACTURING ACTIVE SILICON POWDER FOR THE PREPARATION OF ALKYL- OR ARYL-HALOSILANES

[75] Inventors: Thomas Margaria, Passy; Florence Meoni, Sallanches, both of France

[73] Assignee: Pechiney Electrometallurgie, Courbevoie, France

[21] Appl. No.: 09/391,416

[22] Filed: Sep. 8, 1999

Related U.S. Application Data

[63] Continuation-in-part of application No. 09/119,001, Jul. 20, 1998.

[30] Foreign Application Priority Data

Jul. 24, 1997 [FR] France .................................. 97 09674
Jan. 13, 1999 [FR] France .................................. 99 00420

[51] Int. Cl.[7] .................................. C07F 7/08; C07F 7/16
[52] U.S. Cl. .............. 556/472; 252/182.32; 252/182.33; 252/182.35
[58] Field of Search ....................... 556/472; 252/182.32, 252/182.33, 182.35

[56] References Cited

U.S. PATENT DOCUMENTS

| | | |
|---|---|---|
| 4,602,101 | 7/1986 | Halm et al. . |
| 5,015,751 | 5/1991 | Feldner et al. ........................... 556/472 |
| 5,068,385 | 11/1991 | Degen et al. ............................ 556/472 |
| 5,250,716 | 10/1993 | Mui ......................................... 556/472 |
| 5,429,866 | 7/1995 | Dubrous . |
| 5,500,399 | 3/1996 | Faure et al. ......................... 556/472 X |
| 5,596,119 | 1/1997 | Halm et al. . |
| 5,618,960 | 4/1997 | Schulze et al. . |
| 5,654,460 | 8/1997 | Rong ....................................... 556/472 |
| 5,714,131 | 2/1998 | Margaria et al. .................... 556/472 X |
| 5,874,604 | 2/1999 | Steiner et al. .......................... 556/472 |

OTHER PUBLICATIONS

Database, DE 1668831, translation of abstract, Aug. 1, 1991.
Database WPI, JP 63 055 111 A, translation of abstract, Mar. 9, 1988.
Database, FR 1 519 715 A, translation of abstract, Aug. 1, 1991.

*Primary Examiner*—Paul F. Shaver
*Attorney, Agent, or Firm*—Pollock Vande Sande & Amernick

[57] ABSTRACT

A process for the preparation of active silicon powder for use in the Rochow reaction consisting of grinding metallurgical silicon to a particle size less than 350 $\mu$m in the presence of at least one catalyst and/or reaction promoter, in order to deposit this (these) element(s) on the grain surface, and an active silicon powder with a particle size of less than 350 $\mu$m, with 0.01 to 0.1 $g/m^2$ of copper, and/or 0.003 to 0.03 $g/m^2$ of tin, and/or 0.003 to 0.03 $g/m^2$ of phosphorus on the surface of the grains, for use in the Rochow reaction. The reactivity and selectivity of the powder are improved, and it has a shorter reaction incubation time.

17 Claims, No Drawings

PROCESS FOR MANUFACTURING ACTIVE SILICON POWDER FOR THE PREPARATION OF ALKYL- OR ARYL-HALOSILANES

This application is a continuation-in-part of Ser. No. 09/119,001, filed Jul. 20, 1998.

BACKGROUND OF THE INVENTION

This invention relates to a process for manufacturing silicon powder with a particle size of less than 350 µm, with catalytic properties for the manufacture of alkyl or aryl-halosilanes, intended for the synthesis of silicones.

The synthesis of alkyl or aryl-halosilanes by reaction of a halogenated hydrocarbide, for example methyl chloride, on silicon in the presence of copper at between 250 and 350° C. is known from U.S. Pat. No. 2,380,995 issued to E.G. Rochow in 1945.

This reaction has been industrially developed to a large extent, since the silicone industry is based on it. It is usually used with $CH_3Cl$ and leads to a mixture of various methylchlorosilanes in variable proportions.

The role of copper in the reaction was described 20 for example in the article by P. Trambouze, "Contribution à l'étude du mécanisme de la synthese des méthyl-chlorosilanes—Contribution to the study of the methyl-chlorosilanes synthesis mechanism," Bulletin of the Chemical Society of France, No. 288, 1956, pp. 175625 1765, and in the article by G. H. Kolster, "The v' and ε' phase of the system copper-silicon as solid reactants in the synthesis of dimethyl-dichlorosilane," Compilation of Chemistry publications, vol. 83, 1964, pp. 737–751. These publications show the catalytic role of the $Cu_3Si$ phase in the chloromethylation reaction.

However, the applicant's patent FR 2720385 shows that when increasing quantities of copper are added into silicon, other phases such as $Cu_4SiAl$, $Cu_2Si_3Al$ or $Cu_2Si_3Ca$, appear before $Cu_3Si$ which makes it necessary to add slightly greater quantities of copper than are used in the active $Cu_3Si$ phase. Thus, only a fraction of the added copper is used.

Dow Corning's European Patent No. 0604092 describes the preparation of a silicon-copper alloy containing from 0.01 to 9% of copper for the preparation of halosilanes and recommends that only part of the copper should be added to the alloy, the rest being added in the normal manner using a copper compound mixed with the contact mass.

Union Carbide's European Patent No. 0028009 proposes to place the copper on the surface of silicon particles by mixing powders of two components and heating under a hydrogen atmosphere at about 1000° C.

Elements other than copper have been recognized as having a favorable action on the rate or selectivity of the Rochow reaction. Thus, Wacker Chemie's U.S. Pat. No. 2,666,776 recommends the addition of a metal in the 5th or 8th group in the periodic table, particularly iron, nickel, cobalt or phosphorus to the silicon and copper in the contact mass.

Th. Goldschmidt's Patent DE 1165026 describes the use of silicon doped with phosphorus, arsenic, antimony, bismuth, indium, thallium and/or gallium. General Electric's U.S. Pat. No. 4,500,724 and Union Carbide's Patent EP 0191502 describe the use of a copper-zinc-tin mixture in defined proportions, in the contact mass.

Dow Corning's U.S. Pat. No. 4,602,101 proposes to add 25 to 2500 ppm of phosphorus to the contact mass, in the form of elementary phosphorus or compounds such as phosphides. Dow Corning's Patents EP 0272860 and 0273635 recommend additional phosphorus, either through raw materials used in the manufacture of silicon by carbothermy in an electric arc furnace, or by addition in the refining ladle.

The applicant's European Patent No. 0494837 describes a metallurgical silicon powder with a low surface oxidation, with a surface layer of silica less than 2 nm thick and particularly obtained by grinding under a very slightly reactive atmosphere in the presence of oil. This silicon can significantly improve the chloromethylation reaction rate.

On the subject of grinding techniques, Mitsubishi Metal's Japanese Patent application No. 055111 describes grinding of silicon in a ball grinder with the addition of 0.1 to 20% of a copper compound, for example a cupric or cuprous chloride or oxide, in order to prevent silicon from sticking on the grinder walls.

SUMMARY OF THE INVENTION

The object of the invention is to prepare a metallurgical silicon incorporating one or several catalyzing elements or promoters of the Rochow reaction in a form which makes it more reactive than products used in prior art, and which can thus improve the efficiency of the reaction and its selectivity, in other words the content of dichloro-dimethylsilane in reaction products, and the reaction start up rate.

The object of the invention is a process for the preparation of silicon powder for use in the Rochow reaction consisting of grinding metallurgical silicon containing more than 98% (by weight) of silicon, iron up to 0.4%, aluminum up to 0.2% and calcium up to 0.2%, with a particle size of less than 350 µm in the presence of at least one or the catalysts and/or promoters of the reaction, so as to deposit this or these elements on the grain surface. These catalysts and promoters can be copper, tin and phosphorus. they can be used in the elementary form or in the form of compounds. A particularly suitable compound is copper phosphide $Cu_3P$, added in quantity of 0.1 to 1% by weight.

Another object of the invention is an active silicon powder for the preparation of alkyl- or aryl halosilanes having synthesis reaction catalysts and/or promoters such as copper, tin and phosphorus, on the grain surface.

The quantity of copper used on the grain surface is preferably between 0.01 and 0.1 g per $m^2$ of grain surface area (namely 0.016 to 0.16% by weight), the quantity or tin is between 0.003 and 0.03 g/$m^2$ of grain surface area (namely 0.005 to 0.05% by weight) and the quantity of phosphorus is between 0.003 and 0.03 g/$m^2$ (namely 0.005 to 0.05% by weight).

A particularly efficient silicon powder is obtained with grains having on their surface copper phosphide in quantity comprised between 0.01 and 0.1 g/$m^2$ of grain surface.

The silicon powder according to the invention is preferably a powder with low surface oxidation with a silica layer less than 2 nm thick according to European Patent 0494837 as mentioned above.

DESCRIPTION OF THE PREFERRED EMBODIMENTS

The invention is based on the inventors' observation that the catalytic action is improved when the catalyst and/or the promoter are fixed to the surface of the silicon grains at the time that this surface is generated, in other words when the powder is ground.

Metallurgical silicon is prepared in the reduction arc furnace and it is cast from the liquid state at a temperature of between 1600 and 1800° C. either into ingot molds, the ingots obtained then being crushed into pieces smaller than 120 mm and then ground again to 20 mm, or in a granulation tank full of water. In this case, the solid material obtained is a granulate of homogenous size of the order of 10 mm.

In both cases, the material must be ground to prepare a powder with a particle size of less than 350 µm. Grinding is done in a bar grinder or a ball grinder in which a controlled atmosphere is maintained, preferably an atmosphere enriched in nitrogen and containing less than 8% of oxygen.

Grinding is done with addition of an organic substance capable of protecting the silicon powder from oxidation when it is put back into air. This is done using either a silicone oil or a hydrocarbide type mineral oil, or an ester, in a proportion of at least 1% by weight.

The necessary copper can be added to the surface of the silicon grains by adding a small quantity of a copper compound, such as an oxide and a chloride, into the grinder. This can be done more simply by grinding using copper or copper alloy balls or bars, the wear of which provides the quantity of copper necessary at the surface of the silicon grains.

This quantity must be between 0.01 and 0.1 $g/m^2$ of the grain surface area. The tin quantity can also be fixed between 0.003 and 0.03 $g/m^2$ in a similar manner, in other words by grinding with the addition of Z Ci n compound (oxide or chloride) or using bars or balls made of an alloy containing tin, for example bronze which simultaneously deposits copper and tin.

Phosphorus may also be deposited, in a quantity between 0.003 and 0.03 $g/m^2$, by grinding in the presence of a non-volatile and not excessively oxidizing compound, for example ferrophosphorus, or by using grinder bars or balls made of phosphor bronze, or any other copper alloy containing phosphorus.

Copper and phosphorus can be added together by adding 0.1 to 1% (by weight) of copper phosphide $Cu_3P$. Contrary to other phosphorus compounds, which are toxic or dangerous, this compound is inert and can be used in an industrial environment.

The fixed quantities may, for example, be checked by Auger electron spectroscopy, which can analyze a surface layer a few nanometers thick. The sample on which the surface composition is to be determined is subjected to successive analyses by Auger spectroscopy during ionic pickling which gradually eliminates the surface layer of the product. If the erosion rate is known, this then gives a profile of the oxygen, copper, tin, phosphorus concentration, or the concentration of any other element. The erosion rate is determined by measuring the depth of the final crater ("talystep") or following calibration by measuring a perfectly known concentration profile of an isotope $O_{15}$ obtained by implantation.

If an organic substance such as silicone oil, a hydrocarbide or an ester is added during grinding with a maximum quantity of 1% by weight, and an oxygen depleted atmosphere is maintained in the grinder, silicon grains with a silica surface layer less than 2 nm thick are obtained according to the teachings of Patent EP 0494837 mentioned above.

The reactivity and selectivity of this type of silicon powder during the Rochow reaction is improved, and its reaction incubation time is shorter, which can increase productivity particularly when a discontinuous (batch) process is used.

EXAMPLE 1

An Si—Cu alloy with 13% by weight of copper is prepared by fusion in an induction furnace. The alloy is cast, solidified, ground and sieved. The 50–160 µm fraction is sampled for subsequent tests. Copper is added to the liquid metallurgical silicon sampled from the production of an industrial cast ladle, to obtain an alloy with the following composition (by weight):

Cu=3.31%, Al=0.193%, Ca=0.115%, Fe=0.36%.

The alloy is ground conventionally into a powder with particle size between 50 and 350 µm, and the thickness of the silica surface layer of the order of 4 nm is measured.

Forty g of this powder is mixed with 2.5 g of Si—Cu alloy, and a chloromethylation test is carried out on the mixture obtained. This test consists of placing the mixture powder, together with 0.05 g of ZnO, into a 30 mm diameter glass reaction vessel equipped with a stirrer. A current of $CH_3Cl$ gas is passed through a sintered glass disk supporting the powder. The gas flow is kept constant at $3.6 \; 10^{-3}$ $m^3/h$. After heating the reaction medium and starting the reaction, the system is held at 300° C. After 12 h of reaction, the average dimethyl-dichlorosilane flow Q, and the content $\alpha_2$ of this product in all reaction products, are noted. The average of the four tests gives the following values:

Q=8.0 g/h $\alpha_2$=88%.

It was also noted that the incubation time necessary to start up the reaction was 3 h 5 min.

EXAMPLE 2

Starting from metallurgical silicon already crushed and ground into pieces with a size of between 5 and 20 mm, grinding takes place under a controlled atmosphere with less than 5% of oxygen in a bar grinder equipped for the purpose with bronze bars containing 18% tin. A quantity of silicone oil corresponding to 0.3% of the ground silicon mass was added into the grinder.

The powder obtained was sieved to keep the fraction between 50 and 350 µm. The thickness of the silica layer on the grains was measured at 1.2 nm, and Auger spectroscopy was carried out to determine a surface content of copper equal to 0.07 $g/m^2$ and a surface content of tin equal to 0.02 $g/m^2$.

The same chloromethylation test as in example 1 gave the following results on this powder (average of 4 25 tests):

Q=8.9 g/h, $\alpha_2$=92%, Incubation time=1 h24 min.

EXAMPLE 3

The same procedure was adopted as in example 2, by adding during grinding a quantity of ferrophosphorus to 12% by weight of phosphorus, corresponding to 0.1% of the silicon mass. Auger spectroscopy was used to measure a surface content of phosphorus equal to 0.01 $g/m^2$.

The chloromethylation test results are:

Q=9.0 g/h $\alpha_2$=92.5%, Incubation time=0 h 34 min.

EXAMPLE 4

The same procedure was adopted as in Example 2 by adding during grinding a quantity of copper phosphide, containing 14 weight % of phosphorus, corresponding to 0.45% of the silicon mass. Auger spectroscopy was used to measure a surface contact of phosphorus equal to 0.03 $g/m^2$.

The chloromethylation test results are:

Q=9.5 g/h, $\alpha_2$=94T, Incubation time 28 minutes.

We claim:

1. A process for the preparation of active silicon powder for use in the Rochow reaction consisting of grinding metallurgical silicon containing more than 98% (by weight) of silicon, iron up to 0.4%, aluminum up to 0.2% and calcium up to 0.2%, with a particle size less than 350 µm in the presence of at least one catalyst and/or reaction promoter, in order to deposit this (these) element(s) on the grain surface.

2. The process according to claim 1, wherein the quantity of copper deposited on the surface of the grains is between 0.01 and 0.1 g/m$^2$ of the grain surface area.

3. The process according to claim 2, wherein copper oxide or chloride are added while grinding the silicon.

4. The process according to claim 2, wherein grinding is done in a bar grinder or ball grinder, and the bars or balls are made of copper alloy.

5. The process according to claim 1, wherein tin is deposited on the grain surface in quantities of between 0.003 and 0.03 g/m$^2$ of the grain surface area.

6. The process according to claim 5, wherein tin oxide or chloride is added while grinding the silicon.

7. The process according to claim 5, wherein grinding is done in a bar grinder or ball grinder, and the bars or balls are made of bronze.

8. The process according to claim 1, wherein phosphorus is deposited on the grain surface, in quantities of between 0.003 and 0.03 g/m$^2$ of the grain surface area.

9. The process according to claim 8, wherein ferrophosphorus is added while grinding the silicon.

10. The process according to claim 8, wherein grinding is done in a bar grinder or ball grinder, and the bars or balls are made of phosphor bronze.

11. The process according to claim 8, wherein copper phosphide in quantity of 0.1 to 1% (by weight) is added while grinding the silicon.

12. An active silicon powder for the preparation of alkyl or aryl-halosilanes containing more than 98% (by weight) of silicon, iron up to 0.4%, aluminum up to 0.2% and calcium up to 0.2%, with a particle size of less than 350 µm, comprising copper on the grain surface in quantities of between 0.01 and 0.1 g/m$^2$ of the grain surface area.

13. An active silicon powder for the preparation of alkyl or aryl-halosilanes containing more than 98% of silicon, iron up to 0.4%, aluminum up to 0.2% and calcium up to 0.2%, the particle size being less than 350 µm, comprising tin at the grain surface in quantities of between 0.003 and 0.03 g/m$^2$ of the grain surface area.

14. An active silicon powder for the preparation of alkyl or aryl-halosilanes containing more than 98% of silicon, iron up to 0.4%, aluminum up to 0.2% and calcium up to 0.2%, the particle size being less than 350 µm, comprising phosphorus at the grain surface in quantities of between 0.003 and 0.03 g/m$^2$ of the grain surface area.

15. The active silicon powder according to claim 12, having on the surface of the grain copper phosphide in quantity between 0.01 and 0.1 g/m$^2$ of surface of the grain.

16. The active silicon powder according to claim 12, wherein it comprises other synthesis reaction catalysts and/or promoters on the grain surface.

17. The active silicon powder according to claim 12, wherein the grain surface has a silica layer less than 2 nm thick.

* * * * *